June 1, 1948. D. HEYER 2,442,564
DEVICE FOR CAMERA OR PROJECTOR LENSES FOR PRODUCING REVERSED IMAGES
Filed May 6, 1942

DON HEYER,
INVENTOR

BY *C.R. Wilcin*

ATTORNEY

Patented June 1, 1948

2,442,564

UNITED STATES PATENT OFFICE 2,442,564

DEVICE FOR CAMERA OR PROJECTOR LENSES FOR PRODUCING REVERSED IMAGES

Don Heyer, Los Angeles, Calif.

Application May 6, 1942, Serial No. 441,885

3 Claims. (Cl. 88—57)

This invention relates to a lens structure, and more particularly to a camera or projector lens which is capable of reversing the image.

The development of projectors installed behind the screen, for the purpose of enabling the use of a lighted theater, to obviate the necessity of having the projector in the same room with the spectator, or for cabinet projectors designed for automatic projection, has led to the utilization of reverse printed film. In a projection machine which does not employ mirrors or which employs an even number of mirrors, but which projects an image upon a translucent screen for viewing from the opposite side, it has hitherto been necessary to use such reverse printed film. On the other hand, machines which employ an odd number of mirrors for rear projection or which project from the front of the screen without mirrors utilize standard film. It is impossible to employ ordinary reflectors in some systems to reverse the images when changing from one type of film to another, and consequently the operator of any one type of machine is limited in his choice of subjects to film which is printed in such a manner that it will appear correctly on the screen.

It is thus desirable to provide a means for reversing the image which will not change the optical axis of the projected beam. A mirror installed somewhere in the ordinary projection system usually requires rearrangement of the parts of the machine which must be repeated every time the machine is changed to project a different type of film. For this reason operators have been content in the past to utilize only the type of film for which their machines are adapted.

With the above deficiencies in mind, it is an object of the present invention to provide a means for reversing the image projected by a projection machine or the image recorded by a camera.

It is a further object of the present invention to provide a device for reversing images of a camera or a projector which can be used without changing the optical axis of the instrument on which it is used.

It is a further object of the present invention to provide a reversing device which can be installed in place of the conventional lens.

A further object of the present invention is the provision of a device which provides means for focusing and means for reversing a picture image.

It is a further object of the present invention to provide means for reversing the image cast by a projector which does not require alteration in the positioning of the projector, the screen, or any mirrors which may be used to cast the image on the screen.

This invention possesses many other advantages and has other objects which may be made more easily apparent from a consideration of one embodiment of the invention. For this purpose there is shown a form in the drawings accompanying and forming part of the present specification. This form will now be described in detail, illustrating the general principles of the invention; but it is to be understood that this detailed description is not to be taken in a limiting sense, since the scope of the invention is best defined by the appended claims.

Referring now to the drawings.

Figure 1:
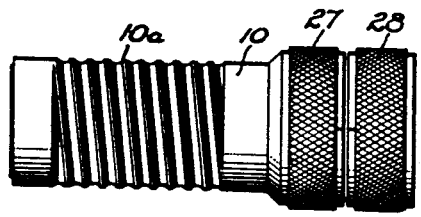
Figure 1 shows one form of device embodying the present invention.
Figure 2:
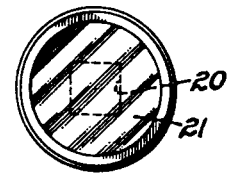
Figure 2 is an end view of the device shown in Figure 1.
Figure 3:
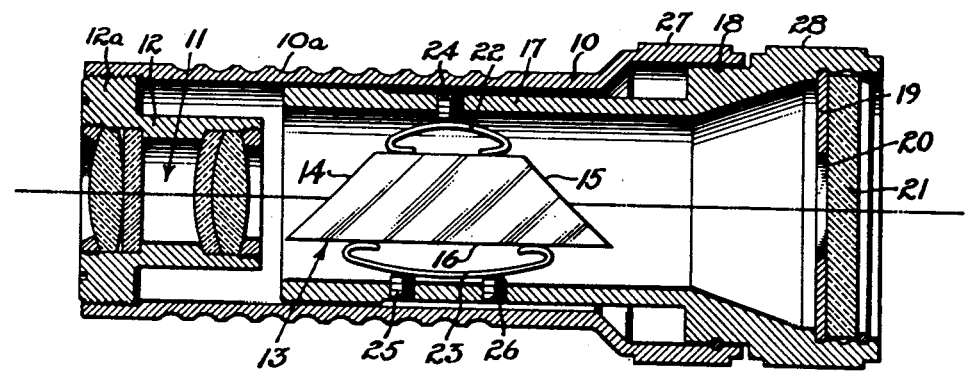
Figure 3 is a section taken along the optical axis of the device shown in Figure 1.
Figure 4:
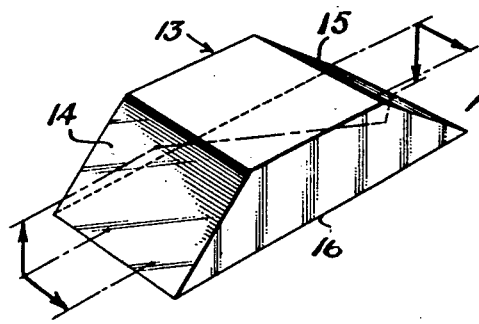
Figure 4 is a perspective view of a portion of the device shown in Figures 1 to 3.

In general, the present invention contemplates a device consisting of a pair of relatively movable tubes, one of which contains a lens for the formation of images and the other of which contains an image reversing device. The tube containing the lens is adapted to be placed on a projector or camera in place of the conventional lens barrel, and the lens in said tube performs the function of the conventional lens. In the figures, the lens barrel or tube 10, may be threaded as at 10a on its exterior surface to permit its adjustability in a camera or projector for focusing purposes. This tube 10 carries in one end thereof the lens assembly 11 utilized for forming an image. In the shown form of device the lens assembly 11 is contained in a tube 12 which is fixedly held in place in the barrel by means of an enlarged portion 12a threaded into the end of the barrel.

In order to reverse the image formed by the lens 11 and at the same time have the beam emerging from the device parallel with the beam entering the device, the prism or prismatic lens 13 is employed. This prism is provided with refracting surfaces 14 and 15 and a reflecting surface 16. The reflecting surface is parallel with the optical axis of the lens and the refracting surfaces intercept the path of the light passing through the device. The sides 14 and 15 of the prismatic lens by which the beam enters and leaves the prism are oblique to the axis of the beam and are at equal angles to the side 16. The refractive power of the glass of which the prism is made bends the entering light in a downward direction (in the drawings) so that it strikes the reflecting surface 16 of the prism. The reflected beam then strikes the other side of the prism and during its passage from the glass to the air is refracted an amount equal to the first refraction upon entering the prism. Obviously, the beam will emerge in a line parallel to the line which it takes before it enters the prism. Any dispersion which may take place because of the initial bending of the light beam is cancelled when the light beam emerges from the other side of the prism.

As the tube 10 is intended to be inserted in place of the ordinary lens barrel it will necessarily have to be turned to properly focus the instrument upon which the device is used. Rotation of this tube and the prismatic lens as a whole will turn the image. For this reason it is necessary to provide a means for turning the prismatic lens 13 relative to the barrel after the image has been properly focused. The lens can then be properly focused and the prismatic lens rotated to present the image in the desired position. This is accomplished in the present instance by the provision of an interior sleeve 17 mounted for rotation within the lens barrel 10. This sleeve is held against removal by a spring lock 18 between the interior of the lens barrel and the exterior of said sleeve.

In order to eliminate the effects of multiple reflections and stray light, it is preferable to provide a mask 19, which prevents the passage of light through the sleeve 17 except through a small opening 20 which is of a size to frame the image to be formed. As it is desired to preserve the prismatic lens 13 as dust free as possible, a glass dust cap 21 is secured to the outer end of the sleeve 17, the entire assembly being thus substantially dusttight.

When these devices are assembled it is necessary to properly position the prismatic lens 13 with respect to the optical axis of the lens 11 in order that the emergent beam will be parallel to the beam striking the prismatic lens. In order to accomplish this, the prismatic lens 13 is shown as held in place by means of two springs 22 and 23, which springs can be adjusted by set screws passing through the walls of the sleeve 17. The spring 22 is provided with a single set screw 24, and the spring 23 is provided with a pair of set screws 25 and 26. With these three screws it is possible to move the prismatic lens up and down and tilt it in order to bring the emergent beam into alignment with the beam entering said prism.

For the sake of convenience in operation the lens barrel or tube 10 is provided with a knurled portion 27, and the tube 17 is provided with a knurled portion 28. The device is utilized by simply inserting the barrel 10 in the camera or projector in place of the conventional lens barrel removed therefrom. The device is focused by turning the tube 10 by the knurled portion 27 until the image is properly focused upon the screen. After focusing, the sleeve 17 is rotated by the knurled portion 28 to bring the image into an upright position.

I claim:

1. A device for forming reversed images, comprising a lens, a movable member mounting said lens, movement of said member serving to focus the lens, an image reversing means cooperating with said lens and mounted for relative rotation with respect to said member whereby said means may be adjusted to present the image in the desired position, and means for adjusting the position of said image reversing means to bring the beam emerging from said means into alignment with the entering beam.

2. A device for forming reversed images, comprising a lens, an exteriorly threaded tubular member in which said lens is mounted, adapted for cooperation with a threaded support to focus the lens in response to rotation of said tube, a second tube telescoped in said member and rotatable with respect thereto, image reversing means, and means mounting said image reversing means in said second tube, said mounting means being adjustable to change the position of said image reversing means to bring the beam emerging from said means into alignment with the entering beam, relative rotation of the tubes serving to cause the image to be presented in the desired position.

3. In a device for forming reversed images, a prism having a pair of opposed surfaces, one of which acts as a reflecting surface, means adjustably supporting said prism for movement to bring the emergent beam from said prism into alignment with the entering beam, comprising a pair of elongated resilient elements extending respectively along said surfaces and contacting said surfaces at points adjacent the end faces of the prism, a pair of relatively adjustable members spaced lengthwise of one of said elements for urging said element toward the prism, and means adjustably engaging the other element intermediate its ends for urging said other element against the prism, relative adjustment of said members serving to vary the inclination of said reflecting surface with respect to the entering beam.

DON HEYER.

REFERENCES CITED

The following references are of record in the file of this patent:

UNITED STATES PATENTS

| Number | Name | Date |
| --- | --- | --- |
| 784,487 | Goerz et al. | Mar. 7, 1905 |
| 784,852 | Goerz | Mar. 14, 1905 |
| 1,209,958 | Groul | Dec. 26, 1916 |
| 1,631,866 | Huerung | June 7, 1927 |
| 1,878,967 | Mihalyi | Sept. 20, 1932 |
| 2,019,234 | Nistri | Oct. 29, 1935 |
| 2,085,050 | Stout | June 29, 1937 |
| 2,137,570 | Gilmore | Nov. 22, 1938 |
| 2,143,011 | De Juhasz | Jan. 10, 1939 |
| 2,257,551 | Griffin et al. | Sept. 30, 1941 |

FOREIGN PATENTS

| Number | Country | Date |
| --- | --- | --- |
| 313,322 | Great Britain | June 13, 1929 |
| 330,310 | Great Britain | June 12, 1930 |
| 388,415 | France | May 30, 1908 |